US012209528B1

(12) United States Patent
Yamada et al.

(10) Patent No.: US 12,209,528 B1
(45) Date of Patent: Jan. 28, 2025

(54) UPPER STRUCTURE OF ENGINE

(71) Applicant: SUZUKI MOTOR CORPORATION, Hamamatsu (JP)

(72) Inventors: Shinichi Yamada, Hamamatsu (JP); Yasuto Takashiba, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 0 days.

(21) Appl. No.: 18/745,457

(22) Filed: Jun. 17, 2024

(30) Foreign Application Priority Data

Jul. 20, 2023 (JP) ................................. 2023-118385

(51) Int. Cl.
*F01N 3/34* (2006.01)
*F02F 7/00* (2006.01)
*F01L 1/053* (2006.01)

(52) U.S. Cl.
CPC ................ *F01N 3/34* (2013.01); *F02F 7/006* (2013.01); *F01L 1/053* (2013.01); *F01L 2001/0537* (2013.01); *F02F 2007/0063* (2013.01)

(58) Field of Classification Search
CPC ..... F01L 1/053; F01L 2001/0537; F01N 3/34; F02F 7/006; F02F 2007/0063
USPC .......................................... 60/304; 123/90.27
See application file for complete search history.

(56) References Cited

U.S. PATENT DOCUMENTS 4,387,565 A * 6/1983 Otani ........................ F01N 3/34 180/219
4,454,714 A 6/1984 Ikenoya et al. ................. 60/293
4,727,717 A * 3/1988 Ikenoya .................. F01L 3/205 180/219
6,223,709 B1 * 5/2001 Takahashi ............... F02B 75/20 123/193.5
2004/0123591 A1 7/2004 Yoshida et al. ................. 60/305
2004/0216791 A1 11/2004 Inui et al. ..................... 137/856
(Continued)

FOREIGN PATENT DOCUMENTS

JP UM A S56-139816 3/1980
JP 2007-231766 A 9/2007
(Continued)

OTHER PUBLICATIONS

Extended European Search Report dated Nov. 4, 2024, issued by the European Patent Office in corresponding application EP 24183516.4.

*Primary Examiner* — Jorge L Leon, Jr.
(74) *Attorney, Agent, or Firm* — Stein IP, LLC

(57) ABSTRACT

An upper structure of an engine in which secondary air is supplied to an exhaust port of an engine. The upper structure includes: a cylinder head in which an exhaust camshaft and an intake camshaft are installed; a cylinder head cover fixed on the cylinder head by fastening members; a reed valve configured to prevent backflow of exhaust gas from the exhaust port to an upstream side; and an ignition plug positioned between the intake camshaft and the exhaust camshaft. An accommodating portion for accommodating the reed valve is provided adjacent to the ignition plug above the exhaust camshaft in the cylinder head cover. A supply path for introducing secondary air from the accommodating portion to the exhaust port is formed on an opposite side of the cylinder head cover from the ignition plug across the exhaust camshaft.

6 Claims, 5 Drawing Sheets

(56) References Cited

U.S. PATENT DOCUMENTS

| | | | | |
|---|---|---|---|---|
| 2008/0011280 | A1 * | 1/2008 | Tawarada | F02F 7/006 123/572 |
| 2008/0178829 | A1 * | 7/2008 | Ochiai | F01L 1/022 123/193.5 |
| 2009/0071421 | A1 * | 3/2009 | Maehara | F01L 1/143 123/41.86 |
| 2022/0112829 | A1 * | 4/2022 | Hatanaka | F01N 3/34 |

FOREIGN PATENT DOCUMENTS

| | | | |
|---|---|---|---|
| JP | 4284997 | B2 | 4/2009 |
| WO | WO-2020253177 | A1 * | 12/2020 |

* cited by examiner

UPPER STRUCTURE OF ENGINE

CROSS-REFERENCE TO RELATED APPLICATION(S)

This application is based on and claims priority under 35 USC 119 from Japanese Patent Application No. 2023-118385 filed on Jul. 20, 2023, the entire content of which is incorporated herein by reference.

TECHNICAL FIELD

The present invention relates to an upper structure of an engine.

BACKGROUND ART

A secondary air supply device for supplying secondary air to an exhaust port to allow unburned gas in exhaust gas to be combusted again is mounted in an engine for the purpose of reducing air pollutants. In addition to an air control device that controls the supply of secondary air from an air cleaner to the exhaust port, the secondary air supply device is provided with a reed valve that prevents backflow of exhaust gas from the exhaust port to the air cleaner side. As an engine provided with this type of secondary air supply device, there has been proposed a double overhead camshaft (DOHC) engine in which a reed valve is installed on an upper surface of a cylinder head cover (for example, see Patent Literature 1).

CITATION LIST

Patent Literature

Patent Literature 1: JP4284997B

In the DOHC engine, an ignition plug is provided between a pair of camshafts, and a fastening bolt of a cylinder head cover is disposed around the ignition plug. In order to install the reed valve while avoiding the ignition plug and the fastening bolt, it is necessary to increase the height of the cylinder head cover or increase the width of the cylinder head cover. Therefore, the size of the engine is increased, which affects layout of peripheral components such as a fuel tank. Depending on an installation location of the reed valve, the supply of secondary air to the exhaust port may deteriorate, and an exhaust gas purification performance may deteriorate.

The present invention has been made in view of the above, and an object of the present invention is to provide an upper structure of an engine in which a reed valve can be installed at an appropriate location while preventing an increase in size of a cylinder head cover.

An upper structure of an engine according to an aspect of the present invention is an upper structure of an engine in which secondary air is supplied to an exhaust port of an engine, the upper structure including: a cylinder head in which an exhaust camshaft and an intake camshaft are installed; a cylinder head cover fixed on the cylinder head by fastening members; a reed valve configured to prevent backflow of exhaust gas from the exhaust port to an upstream side; and an ignition plug positioned between the intake camshaft and the exhaust camshaft, in which an accommodating portion for accommodating the reed valve is provided adjacent to the ignition plug above the exhaust camshaft in the cylinder head cover, and a supply path for introducing secondary air from the accommodating portion to the exhaust port is formed on an opposite side of the cylinder head cover from the ignition plug across the exhaust camshaft.

According to the upper structure of an engine of the aspect of the present invention, the reed valve does not interfere with the ignition plug on the cylinder head cover. Further, generally, in order to ensure a sealing performance between the cylinder head cover and the cylinder head, the fastening members are positioned at a plurality of positions apart from the ignition plug, but the reed valve is installed adjacent to the ignition plug, so that the reed valve does not interfere with the fastening members. An increase in size of the cylinder head cover can be prevented, and an influence on layout of peripheral components can be prevented.

The accommodating portion of the reed valve is provided above the exhaust camshaft, and the supply path is formed on the opposite side from the ignition plug across the exhaust camshaft, so that the supply path can be shortened without changing the arrangement of the exhaust camshaft and the ignition plug. Pressure loss of secondary air in the supply path can be prevented to improve an exhaust gas purification performance.

DESCRIPTION OF EMBODIMENTS

In an upper structure of an engine according to one embodiment of the present invention, secondary air is supplied to an exhaust port of the engine. An exhaust camshaft and an intake camshaft are installed on a cylinder head in an upper portion of the engine, and a cylinder head cover is fixed on the cylinder head by a fastening member. An ignition plug is provided between the intake camshaft and the exhaust camshaft. In the cylinder head cover, an accommodating portion for a reed valve is provided adjacent to the ignition plug above the exhaust camshaft, and the reed valve prevents backflow of exhaust gas from an exhaust port to an upstream side. By providing the accommodating portion of the reed valve adjacent to the ignition plug, the reed valve does not interfere with the ignition plug on the cylinder head cover. Further, generally, in order to ensure a sealing performance between the cylinder head cover and the cylinder head, the fastening members are positioned at a plurality of positions apart from the ignition plug, but the reed valve is installed adjacent to the ignition plug, so that the reed valve does not interfere with the fastening members. An increase in size of the cylinder head cover can be prevented, and an influence on layout of peripheral components can be prevented. By forming a supply path of secondary air on an opposite side of the cylinder head cover from the ignition plug across the exhaust camshaft, the supply path can be shortened without changing arrangement of the exhaust camshaft and the ignition plug. Pressure loss of secondary air in the supply path can be prevented to improve an exhaust gas purification performance.

Embodiment

Figure 1:
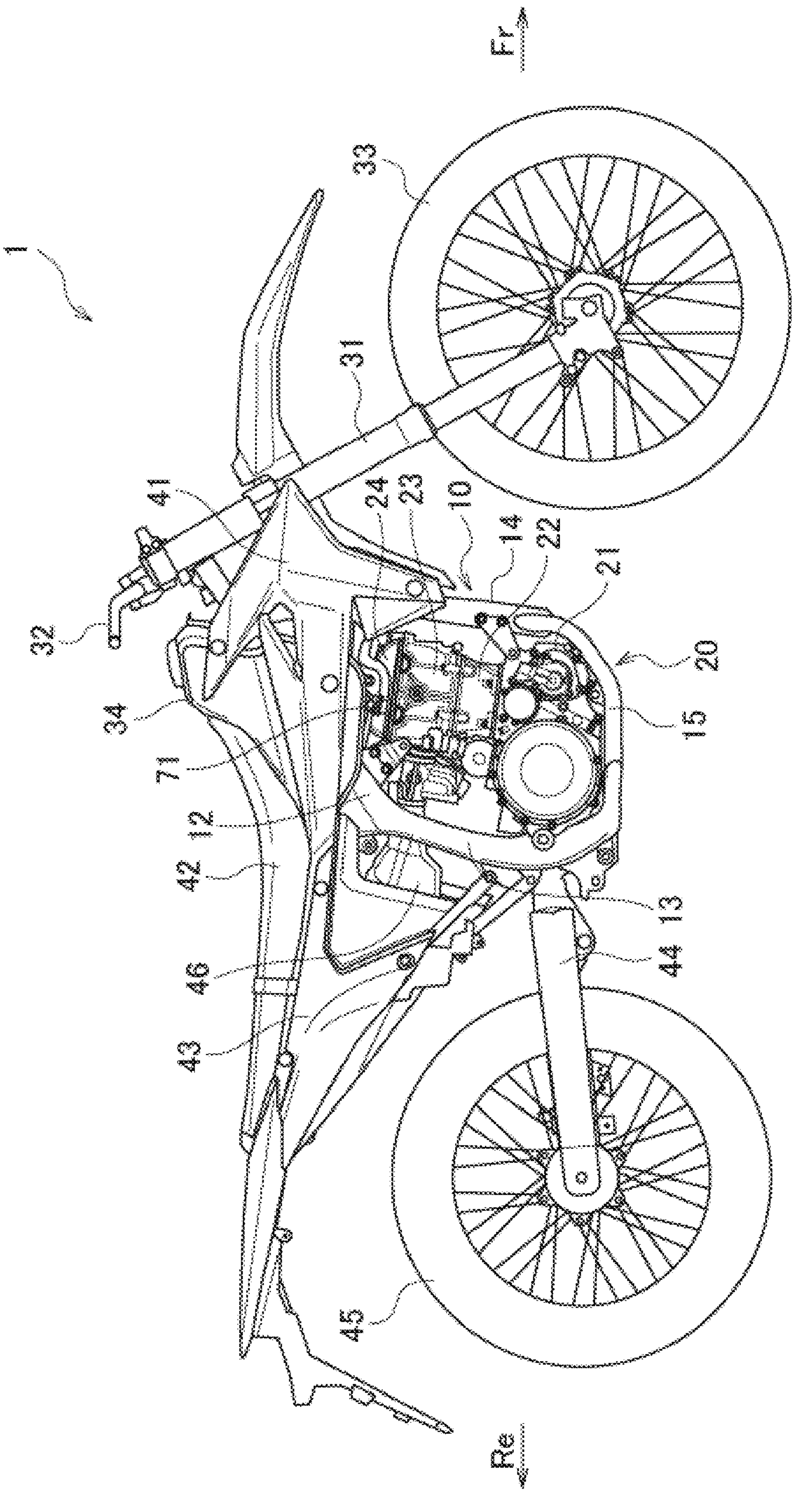
FIG. 1 is a right side view of a straddle-type vehicle according to the present embodiment.

Hereinafter, a straddle-type vehicle according to the present embodiment will be described with reference to the accompanying drawings. FIG. 1 is a right side view of the straddle-type vehicle according to the present embodiment. In the following drawings, an arrow Fr indicates a vehicle front side, an arrow Re indicates a vehicle rear side, an arrow L indicates a vehicle left side, and an arrow R indicates a vehicle right side.

As shown in FIG. 1, a straddle-type vehicle 1 is configured by mounting various components such as an engine 20 and an electrical system on a vehicle body frame 10. A pair of main frames 12 extend diagonally rearward and downward from a head pipe of the vehicle body frame 10, and rear portions of the pair of main frames 12 form a pair of body frames 13 bent downward. A down frame 14 extends downward from the head pipe, and a pair of under frames 15 bent rearward are connected to a lower portion of the down frame 14. Rear end portions of the pair of under frames 15 are connected to lower portions of the pair of body frames 13, and the vehicle body frame 10 is formed in a cradle shape.

A front fork 31 is steerably supported by the head pipe via a steering shaft (not shown). A handlebar 32 is provided on an upper portion of the front fork 31, and a front wheel 33 is rotatably supported on a lower portion of the front fork 31. A fuel tank 34 is placed over upper portions of the pair of main frames 12, and the main frames 12 and the fuel tank 34 are covered by front side covers 41 from lateral sides. A seat 42 is installed behind the fuel tank 34, and a seat frame supporting the seat 42 from below is covered from the lateral sides by rear side covers 43.

A swing arm 44 is swingably supported by the body frames 13. The swing arm 44 extends rearward from the body frame 13, and a rear wheel 45 is rotatably supported at a rear end of the swing arm 44. The engine 20 is a four-stroke single-cylinder engine, and is suspended inside the vehicle body frame 10 via a plurality of suspension brackets. A cylinder assembly in which a cylinder 22, a cylinder head 23, and a cylinder head cover 24 are stacked is attached to an upper portion of a crankcase 21 of the engine 20. An intake device such as an air cleaner 46 is installed behind the cylinder head 23.

A secondary air supply device that promotes combustion of unburned gas in exhaust gas is mounted on the straddle-type vehicle 1 according to the present embodiment. In the secondary air supply device, a passage of secondary air from the air cleaner 46 to an exhaust port 61 (see FIG. 5) is formed, and a reed valve 73 (see FIG. 5) for preventing a backflow of exhaust gas from the exhaust port 61 to the air cleaner 46 side is installed in the cylinder head cover 24. In this case, an ignition plug 59 and fastening bolts 69*a* to 69*c* are provided on the cylinder head cover 24 (see FIG. 4), and it is necessary to secure an installation space of the reed valve 73 so as not to interfere with the ignition plug 59 and the fastening bolts 69*a* to 69*c*.

A flow path of secondary air from the reed valve 73 to the exhaust port 61 is formed in the cylinder head cover 24, but depending on an installation location of the reed valve 73, the flow path becomes longer, which increases pressure loss and deteriorates the supply of secondary air to the exhaust port 61. In order to ensure the exhaust gas purification performance, the reed valve 73 must be installed in consideration of a positional relationship with the exhaust port 61. The reed valve 73 is disposed in a space above an exhaust camshaft 56 so that the reed valve 73 is brought close to the exhaust port 61 without interfering with the ignition plug 59 and the fastening bolts 69*a* to 69*c* (see FIG. 4).

Figure 2:
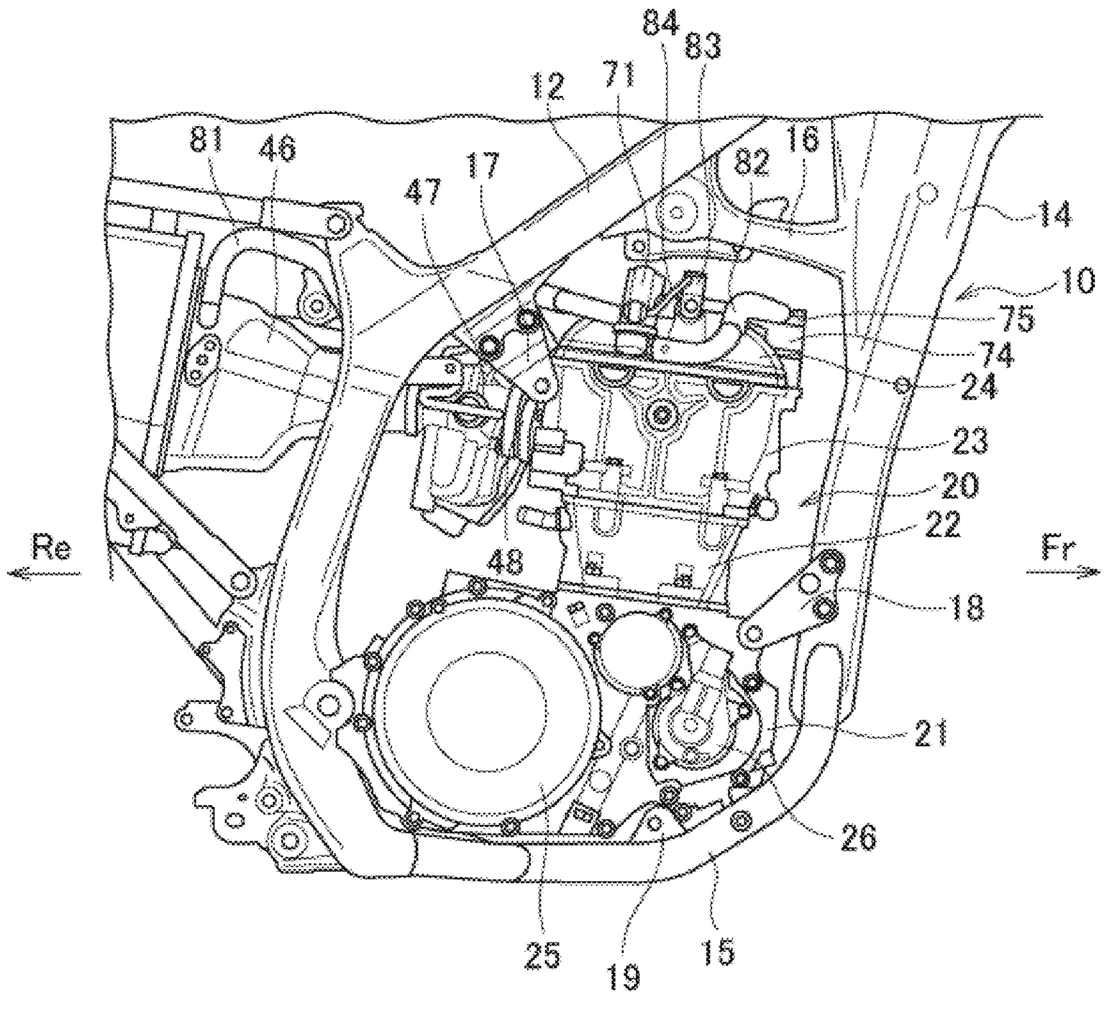
FIG. 2 is a right side view of a periphery of an engine according to the present embodiment.
Figure 3:
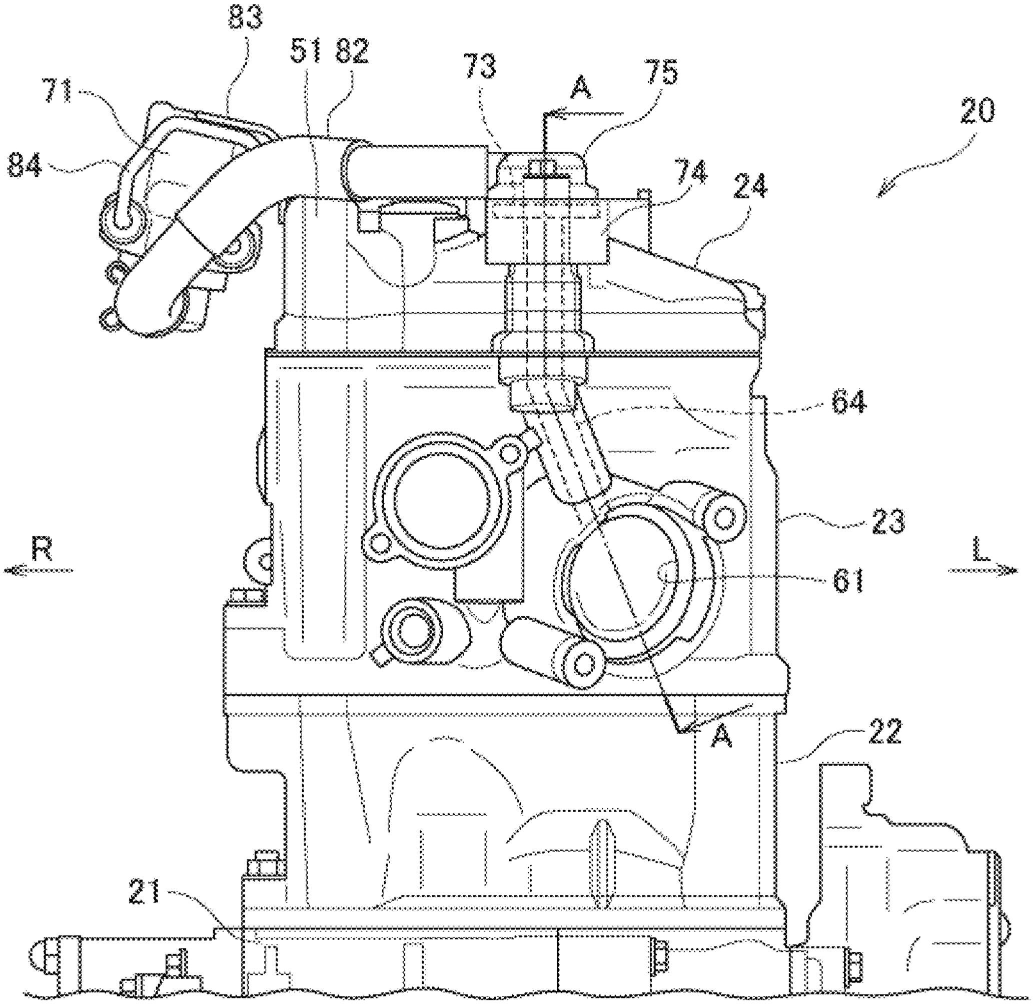
FIG. 3 is a front view of an upper portion of the engine according to the present embodiment.
Figure 4:
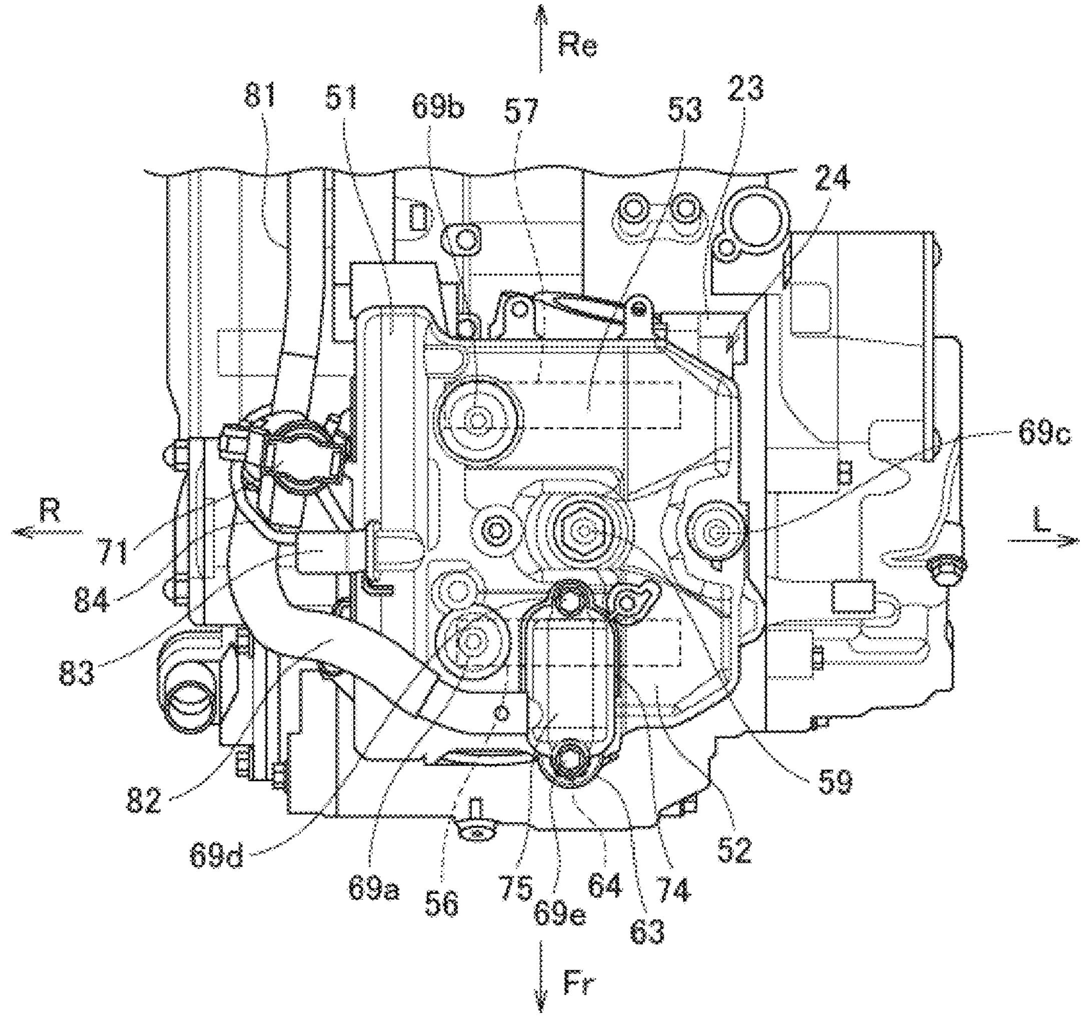
FIG. 4 is a top view of the upper portion of the engine according to the present embodiment.

An upper structure of an engine will be described with reference to FIGS. 2 to 4. FIG. 2 is a right side view of a periphery of the engine according to the present embodiment. FIG. 3 is a front view of an upper portion of the engine according to the present embodiment. FIG. 4 is a top view of the upper portion of the engine according to the present embodiment.

As shown in FIG. 2, the pair of main frames 12 and the down frame 14 are connected to each other via bridge tubes 16 for reinforcement at an upper portion of the vehicle body frame 10. Below the bridge tubes 16, the cylinder head 23 at an upper portion of the engine 20 and the crankcase 21 at a lower portion of the engine 20 are suspended from the vehicle body frame 10 by suspension brackets 17 to 19. The cylinder 22 is installed on the crankcase 21, and the cylinder head 23 is installed on the cylinder 22. The cylinder head cover 24 is installed on the cylinder head 23, and a double overhead camshaft (DOHC) type valve train is accommodated inside the cylinder head 23 and the cylinder head cover 24.

A clutch cover 25 that covers a clutch (not shown) from the lateral side is attached to a right side surface of the crankcase 21. A washer pump 26 for feeding cooling water to the engine 20 is attached in front of the clutch cover 25. The air cleaner 46 is disposed behind the engine 20. The air cleaner 46 is connected to a rear side (intake side) of the cylinder head 23 via a throttle body 47 and an intake pipe 48. After air is sent from the air cleaner 46 to the throttle body 47 and an intake amount is adjusted by the throttle body 47, air is supplied from the throttle body 47 to an intake port 62 (see FIG. 5) of the cylinder head 23 through the intake pipe 48.

As shown in FIGS. 2 and 3, an electromagnetic air cut valve 71 is installed on the right side of the cylinder head cover 24 as an air control device for secondary air. An accommodating portion 74 of a reed valve 73 is provided on a front side (exhaust side) of the cylinder head cover 24, and the accommodating portion 74 is closed from above by a reed valve cover 75. A first hose 81 extends from the air cleaner 46 to the air cut valve 71, and a second hose 82 extends from the air cut valve 71 to the reed valve cover 75. A supply path 64 of secondary air extends from the inside of the reed valve cover 75 to the exhaust port 61 of the cylinder head 23.)

Secondary air is sent from the air cleaner 46 to the air cut valve 71 through the first hose 81, a timing of feeding the secondary air is controlled by the air cut valve 71, and the secondary air is sent from the air cut valve 71 into the reed valve cover 75 through the second hose 82. Secondary air is supplied from the inside of the reed valve cover 75 to the exhaust port 61, and unburned gas in the exhaust gas is combusted again to reduce air pollutants. Since the reed valve 73 is disposed in the reed valve cover 75, the reed valve 73 prevents the exhaust gas from flowing back from the exhaust port 61 to the air cleaner 46 side.

The air cut valve 71 is supported by the cylinder head cover 24 via a bracket 83 in a floating state. The bracket 83 is formed into an inverted L shape with a vertical plate portion and a horizontal plate portion, and the vertical plate portion of the bracket 83 is fixed to an upper wall 51 of a cam chain chamber of the cylinder head cover 24. An inverted U-shaped linear member 84 with both ends facing downward is provided on the horizontal plate portion of the bracket 83, and the air cut valve 71 is attached to both ends of the linear member 84. As compared with a configuration in which the air cut valve 71 is supported by the vehicle body frame 10, the air cut valve 71 can be installed close to the cylinder head cover 24.

As shown in FIG. 4, a right side of an upper surface of the cylinder head cover 24 bulges out to form an upper wall 51 of the cam chain chamber. A front side of the upper surface of the cylinder head cover 24 bulges out to form an upper wall 52 of an exhaust camshaft chamber, and a rear side of the upper surface of the cylinder head cover 24 bulges out to form an upper wall 53 of an intake camshaft chamber. The upper wall 51 of the cam chain chamber extends in an engine front-rear direction, and the upper walls 52 and 53 of the exhaust camshaft chamber and the intake camshaft chamber extend in an engine width direction. The upper walls 52 and 53 of the exhaust camshaft chamber and the intake camshaft chamber are formed one step lower than the upper wall 51 of the cam chain chamber.

The ignition plug 59 is disposed between the upper walls 52 and 53 of the exhaust camshaft chamber and the intake camshaft chamber, that is, between the exhaust camshaft 56 and an intake camshaft 57. Three fastening bolts (fastening members) 69*a* to 69*c* are installed around the ignition plug 59, and the cylinder head cover 24 is fixed to the cylinder head 23 by the three fastening bolts 69*a* to 69*c*. In a top view, the fastening bolts 69*a* and 69*b* are positioned above the exhaust camshaft 56 and the intake camshaft 57 on a right side of the engine (one side in the engine width direction), and the fastening bolt 69*c* is positioned on a lateral side of the ignition plug 59 on a left side of the engine (the other side in the engine width direction).

In this case, the fastening bolt 69*a* is positioned diagonally forward to the right of the ignition plug 59 on the upper wall 52 of the exhaust camshaft chamber, the fastening bolt 69*b* is positioned diagonally rearward to the right of the ignition plug 59 on the upper wall 53 of the intake camshaft chamber, and the fastening bolt 69*c* is positioned on the left side of the ignition plug 59. The cylinder head cover 24 is fixed to the cylinder head 23 in a balanced manner by the three fastening bolts 69*a* to 69*c*, thereby ensuring a sealing performance. Generally, in order to ensure the sealing performance of the cylinder head cover 24, four-point fixing is mainly used, but by fixing three points, an installation space of the reed valve 73 (see FIG. 5) is easily secured in front of the ignition plug 59.

In the cylinder head cover 24, the accommodating portion 74 for accommodating the reed valve 73 is provided adjacent to the ignition plug 59 above the exhaust camshaft 56, that is, immediately in front of the ignition plug 59 in the upper wall 52 of the exhaust camshaft chamber. The accommodating portion 74 is closed from above by the reed valve cover 75, and the reed valve cover 75 is screwed to the accommodating portion 74 by a pair of fastening bolts 69*d* and 69*e*. In this way, the reed valve 73 is installed in an empty space of the cylinder head cover 24 so as not to interfere with the ignition plug 59 and the fastening bolts 69*a* to 69*c*, thereby preventing an increase in size of the cylinder head cover 24.

On the opposite side of the cylinder head cover 24 from the ignition plug 59 across the exhaust camshaft 56, a front wall in the vicinity of the accommodating portion 74 of the cylinder head cover 24 partially protrudes forward. A protruding portion 63 of the cylinder head cover 24 is formed with the supply path 64 for introducing secondary air from the accommodating portion 74 to the exhaust port 61 (see FIG. 3). Since only the vicinity of the accommodating portion 74 of the cylinder head cover 24 protrudes, an increase in size of the cylinder head cover 24 is minimized. Since the supply path 64 extends downward from the accommodating portion 74, the supply path 64 is shortened while avoiding the exhaust camshaft 56, and the pressure loss of the secondary air is prevented.

Figure 5:
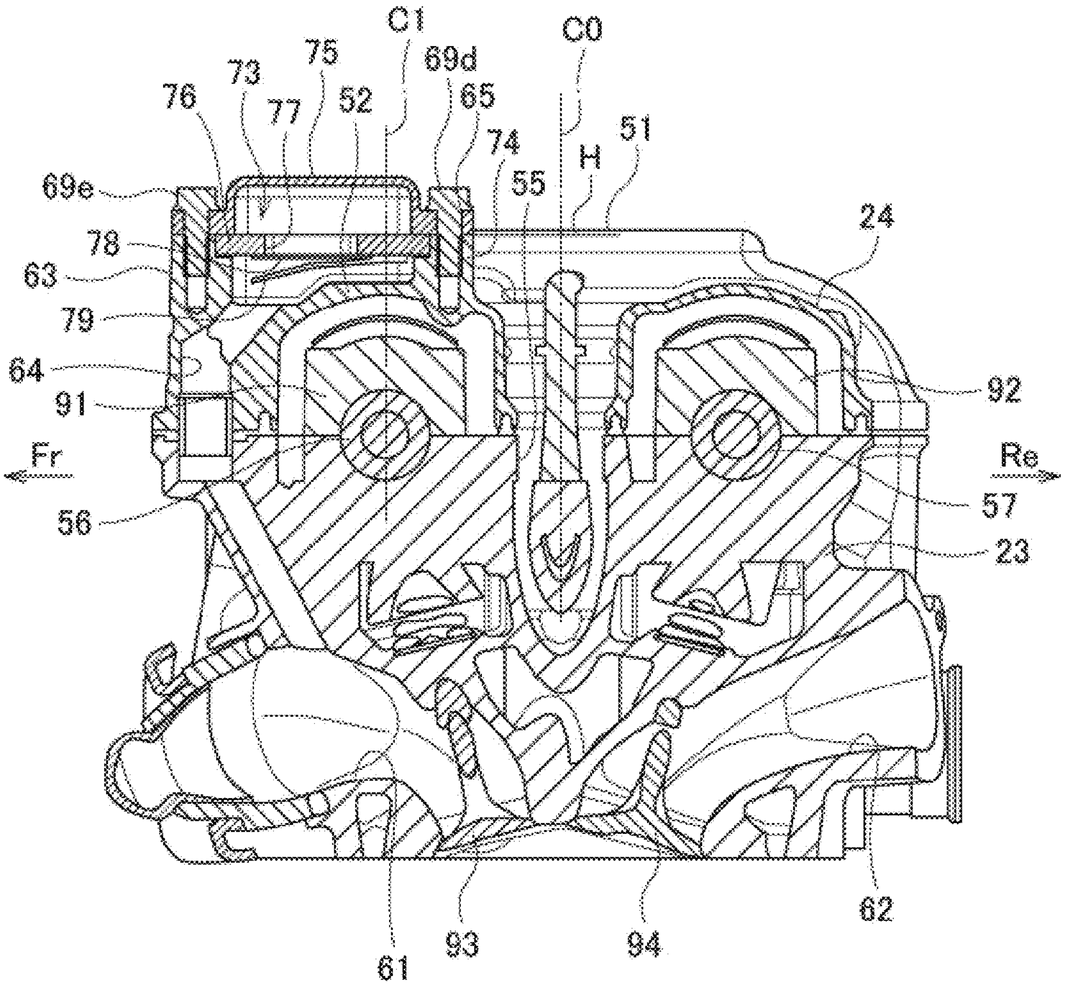
FIG. 5 is a cross-sectional view of the upper portion of the engine of FIG. 3 taken along a line A-A.

Layout of the reed valve and the supply path will be described with reference to FIGS. 3 and 5. FIG. 5 is a cross-sectional view of the upper portion of the engine of FIG. 3 taken along a line A-A. In FIG. 5, the ignition plug is omitted.

As shown in FIGS. 3 and 5, the exhaust port 61 is formed on a lower front side of the cylinder head 23, and an intake port 62 is formed on a lower rear side of the cylinder head 23. The cylinder head cover 24 is installed on the cylinder head 23, the exhaust camshaft chamber is formed on an upper front side of the cylinder head 23, and the intake camshaft chamber is formed on an upper rear side of the cylinder head 23. In the exhaust camshaft chamber, the exhaust camshaft 56 is installed in the cylinder head 23 via an exhaust cam housing 91, and in the intake camshaft chamber, the intake camshaft 57 is installed in the cylinder head 23 via an intake cam housing 92.

A plug hole 55 for the ignition plug 59 (see FIG. 4) is formed in substantially a center of the cylinder head 23 and the cylinder head cover 24. On a front side of the plug hole 55, an exhaust valve 93 is driven by the exhaust camshaft 56 to open and close the exhaust port 61, and on a rear side of the plug hole 55, an intake valve 94 is driven by the intake camshaft 57 to open and close the intake port 62. The accommodating portion 74 of the reed valve 73 is formed on the upper wall 52 of the exhaust camshaft chamber of the cylinder head cover 24. A bottom surface of the accommodating portion 74 becomes deeper toward the front from a position directly above the exhaust camshaft 56.

An upper portion of the accommodating portion 74 is recessed in a stepped manner, and the reed valve 73 is installed in the recess of the accommodating portion 74. An opening 77 is formed in a plate-shaped pedestal 76 of the reed valve 73, and a reed 78 and a base end portion of a stopper 79 are fixed to a lower surface of the pedestal 76. The reed 78 is formed of a thin metal or resin plate and is elastically deformable. When the exhaust port 61 has a positive pressure, the opening 77 is closed to prevent backflow of exhaust gas, and when the exhaust port 61 has a negative pressure, the opening 77 is opened and secondary air is supplied. A distal end portion of the stopper 79 is separated downward from the pedestal 76, and an opening amount of the reed 78 is regulated by the stopper 79.

The distal end portion of the stopper 79 of the reed valve 73 is positioned more forward (on the supply path 64 side) than the exhaust camshaft 56. Therefore, the distal end portion of the stopper 79 does not interfere with the upper wall 52 of the camshaft chamber, and the reed valve 73 can be installed at a lower position above the exhaust camshaft 56. The reed valve cover 75 is disposed on the accommodating portion 74 of the cylinder head cover 24. In this case, the height H of a mating surface 65 between the accommodating portion 74 and the reed valve cover 75 is lower than the upper surface of the upper wall 51 of the cam chain chamber of the cylinder head cover 24, so that an increase in the height of the cylinder head cover 24 is prevented.

The reed valve cover 75 is fixed to the accommodating portion 74 by the fastening bolts 69*d* and 69*e* at positions facing each other across the exhaust camshaft 56 in a top view. The fastening bolt 69*d* is positioned between axes C0 and C1 that pass through the plug hole 55 and the center of the exhaust camshaft 56 and are parallel to a cylinder axis. The fastening bolt 69*e* is positioned on the protruding portion 63 of the cylinder head cover 24 in front of the axis C1 of the exhaust camshaft 56. Since the fastening bolts 69*d* and 69*e* avoid being directly above the exhaust camshaft 56, screw holes for the fastening bolts 69*d* and 69*e* can be secured without increasing the height of the mating surfaces 65 between the accommodating portion 74 and the reed valve cover 75.

The bottom surface of the accommodating portion 74 becomes deeper toward the front, and the supply path 64 is formed from the deepest position of the bottom surface of the accommodating portion 74 toward the exhaust port 61. In the protruding portion 63 of the cylinder head cover 24, the supply path 64 passes directly below the fastening bolt 69*e*, and in the cylinder head 23, the supply path 64 extends diagonally to the vicinity of an outlet of the exhaust port 61. The supply path 64 extends in an upper-lower direction so as to go around the front of the exhaust camshaft 56. Since the reed valve 73 is positioned above the exhaust port 61, the supply path 64 from the reed valve 73 to the exhaust port 61 is shortened.

As described above, according to the upper structure of the engine 20 according to the present embodiment, the reed valve 73 does not interfere with the ignition plug 59 and the fastening bolts 69*a* to 69*c* on the cylinder head cover 24. An increase in the size of the cylinder head cover 24 can be prevented, and an influence on the layout of peripheral components can be prevented. The accommodating portion 74 of the reed valve 73 is provided above the exhaust camshaft 56, and the supply path 64 is formed on the opposite side from the ignition plug 59 across the exhaust camshaft 56, so that the supply path 64 can be shortened without changing arrangement of the exhaust camshaft 56 and the ignition plug 59. The pressure loss of secondary air in the supply path 64 can be prevented to improve the exhaust gas purification performance.

Although a single-cylinder engine is exemplified in the present embodiment, a multiple-cylinder engine may be used. In this case, the cylinder head cover is preferably fixed to the cylinder head by three fastening bolts per cylinder.

Although the cylinder head cover is fixed to the cylinder head at three positions in the present embodiment, the cylinder head cover may be fixed to the cylinder head at four or more positions.

In the present embodiment, the reed valve cover is fixed to the accommodating portion of the cylinder head cover at two positions, but the reed valve cover may be fixed to the accommodating portion at three or more positions.

The upper structure of an engine according to the present embodiment is not limited to the off-road type straddle-type vehicle described above, and may be adopted in other types of straddle-type vehicles. The straddle-type vehicle is not limited to a general vehicle in which a driver rides on a seat in a posture straddling the seat, and includes a scooter-type vehicle in which the driver rides on the seat without straddling the seat.

As described above, a first aspect is an upper structure of an engine in which secondary air is supplied to an exhaust port (61) of an engine (20), the upper structure including: a cylinder head (23) in which an exhaust camshaft (56) and an intake camshaft (57) are installed; a cylinder head cover (24) fixed on the cylinder head by fastening members (fastening bolts 69*a* to 69*c*); a reed valve (73) configured to prevent backflow of exhaust gas from the exhaust port to an upstream side; and an ignition plug (59) positioned between the intake camshaft and the exhaust camshaft, in which an accommodating portion (74) for accommodating the reed valve is provided adjacent to the ignition plug above the exhaust camshaft in the cylinder head cover, and a supply path (64) for introducing secondary air from the accommodating portion to the exhaust port is formed on an opposite side of the cylinder head cover from the ignition plug across the exhaust camshaft. According to this configuration, the reed valve does not interfere with the ignition plug on the cylinder head cover. Further, generally, in order to ensure a sealing performance between the cylinder head cover and the cylinder head, the fastening members are positioned at a plurality of positions apart from the ignition plug, but the reed valve is installed adjacent to the ignition plug, so that the reed valve does not interfere with the fastening members. An increase in size of the cylinder head cover can be prevented, and an influence on layout of peripheral components can be prevented. The accommodating portion of the reed valve is provided above the exhaust camshaft, and the supply path is formed on the opposite side from the ignition plug across the exhaust camshaft, so that the supply path can be shortened without changing the arrangement of the exhaust camshaft and the ignition plug. Pressure loss of secondary air in the supply path can be prevented to improve an exhaust gas purification performance.

According to a second aspect, in the first aspect, the accommodating portion is closed by a reed valve cover (75) from above, a cam chain chamber is formed in the cylinder head cover, and a mating surface (65) between the accommodating portion and the reed valve cover is lower than an upper surface of an upper wall (51) of the cam chain chamber of the cylinder head cover. According to this configuration, the mating surface between the accommodating portion and the reed valve cover is lowered, so that an increase in the height of the cylinder head cover can be prevented.

According to a third aspect, in the second aspect, the reed valve cover is fixed to the accommodating portion at positions facing each other across the exhaust camshaft. According to this configuration, the reed valve cover is fixed at a position avoiding being directly above the exhaust camshaft, and the mating surface between the reed valve cover and the accommodating portion can be lowered.

According to a fourth aspect, in any one of the first to third aspects, one wall of the cylinder head cover on the opposite side from the ignition plug across the exhaust camshaft protrudes, and a supply path for introducing secondary air from the accommodating portion to the exhaust port is formed inside a protruding portion (63) of the one wall. According to this configuration, the supply path can be formed at a position avoiding the exhaust camshaft while minimizing an increase in size of the cylinder head cover.

According to a fifth aspect, in any one of the first to the fourth aspects, the reed valve includes a pedestal (76) in which an opening (77) is formed, a reed (78) that opens and closes the opening, and a stopper (79) that regulates an opening amount of the reed, a base end portion of the stopper is fixed to the pedestal such that a distal end portion of the stopper is separated downward from the pedestal, and the distal end portion of the stopper is positioned closer to the supply path side than the exhaust camshaft. According to this configuration, the reed valve can be installed at a lower position above the exhaust camshaft.

According to a sixth aspect, in any one of the first to fifth aspects, the cylinder head cover is fixed to the cylinder head by three fastening members per cylinder, and the three fastening members are positioned at two positions above the intake camshaft and the exhaust camshaft on one side in an engine width direction and one position on a lateral side of the ignition plug on another side in the engine width direction, in a top view. According to this configuration, the cylinder head cover is fixed to the cylinder head in a balanced manner by the three fastening members per cylinder, so that the sealing performance is secured, and an installation space of the reed valve is easily secured.

Although the present embodiment has been described, as another embodiment, the embodiment described above and modifications may be combined entirely or partially.

The technique according to the present invention is not limited to the embodiment described above, and may be variously changed, replaced, or modified without departing from the gist of the technical concept. Further, the present invention may be implemented by other methods as long as the technical concept can be implemented by the methods through advance of the technique or other derivative techniques. Therefore, the claims cover all embodiments that may fall within the scope of the technical concept.

The invention claimed is:

1. An upper structure of an engine in which secondary air is supplied to an exhaust port of an engine, the upper structure comprising:

a cylinder head in which an exhaust camshaft and an intake camshaft are installed;

a cylinder head cover fixed on the cylinder head by fastening members;

a reed valve configured to prevent backflow of exhaust gas from the exhaust port to an upstream side; and an ignition plug positioned between the intake camshaft and the exhaust camshaft, wherein:

an accommodating portion for accommodating the reed valve is provided adjacent to the ignition plug above the exhaust camshaft in the cylinder head cover, and a supply path for introducing secondary air from the accommodating portion to the exhaust port is formed on an opposite side of the cylinder head cover from the ignition plug across the exhaust camshaft.

2. The upper structure according to claim 1, wherein:

the accommodating portion is closed by a reed valve cover from above, and a cam chain chamber is formed in the cylinder head cover, and a mating surface between the accommodating portion and the reed valve cover is lower than an upper surface of an upper wall of the cam chain chamber of the cylinder head cover.

3. The upper structure according to claim 2, wherein:

the reed valve cover is fixed to the accommodating portion at positions facing each other across the exhaust camshaft.

4. The upper structure according to claim 1, wherein:

a first wall of the cylinder head cover on the opposite side from the ignition plug across the exhaust camshaft includes a protruding portion, and the supply path is formed inside the protruding portion of the first wall.

5. The upper structure according to claim 1, wherein:

the reed valve includes a pedestal in which an opening is formed, a reed that opens and closes the opening, and a stopper that regulates an opening amount of the reed, a base end portion of the stopper is fixed to the pedestal such that a distal end portion of the stopper is separated downward from the pedestal, and the distal end portion of the stopper is positioned closer to the supply path than the exhaust camshaft.

6. The upper structure according to claim 1, wherein:

the cylinder head cover is fixed on the cylinder head by three fastening members per cylinder, and in a top view of the cylinder head cover, the three fastening members of each cylinder are respectively positioned at two positions above the intake camshaft and the exhaust camshaft on a first side in an engine width direction, and one position on a lateral side of the ignition plug on a second side in the engine width direction.

* * * * *